2,821,004

METAL CLIP ADAPTED FOR USE WITH RUBBER PIPING

Luigi Romano and Silvio Romano, Voghera, Italy

Application December 17, 1954, Serial No. 475,890

Claims priority, application Italy December 21, 1953

1 Claim. (Cl. 24—273)

Our invention has for its object to provide an improved hose clip and, to this end, the invention consists of the novel devices and combination of devices hereinafter described and defined in the appended claim.

The invention is illustrated in the accompanying drawings, wherein like characters indicate like parts through the several views.

Referring to the drawings.

Figure 1:
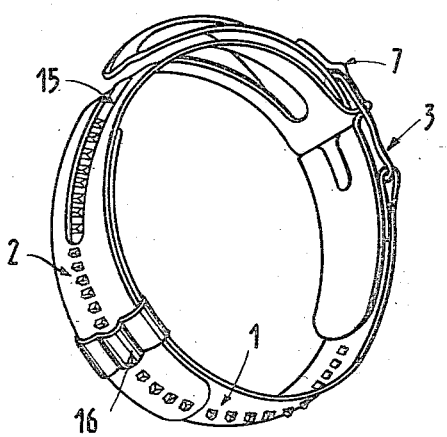
Fig. 1 is a perspective view of the hose clip according to our invention.
Figure 2:
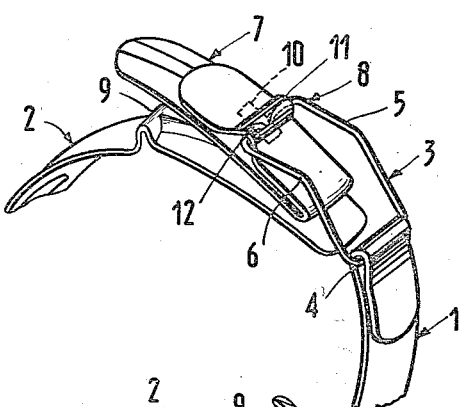
Fig. 2 is an enlarged perspective view of a detail of Fig. 1.
Figure 3:
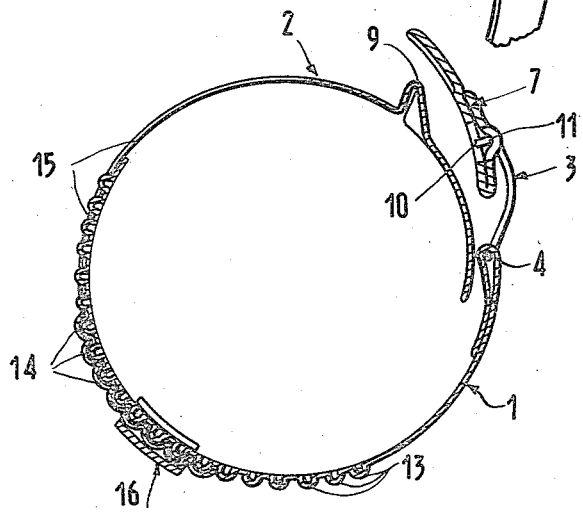
Fig. 3 is a longitudinal middle sectional view of Fig. 1.

Referring to said figures the hose clip comprises an encircling band formed by a first section 1 and a second section 2 adapted to be secured in overlapping position as shown by Fig. 1 and 3. The amount of overlapping is variable for the adjustment of the hose clip to pipes of different diameters. A resilient ring 3 is shaped substantially in the form of a rectangle with one short side thereof 4 pivoted to one end of said first section and with the longitudinal sides 5, 6 being bent outwardly so that an extensible means is provided thereby. A tension lever 7 of the second class is pivotally mounted on the other short side 8 of said rectangular ring 7 and a projection 9 formed on the said second section 2 serves as fulcrum for the lever 7.

According to our invention for preventing the short side 8 of ring 3 from escaping from the lever 7 a slot 10 is formed in said lever 7, into which extend the ends 11, 12 of the ring 3 which are bent downwardly to fit loosely in the slot 10; thus a soldering of the ring ends is avoided and an easy and cheap assembling of the ring 3 is obtained.

In order to prevent the first and second sections 1 and 2 from slipping along one another, a number of projections 13 are provided along a substantial length of the second section of the band and a number of recesses 14 are provided in the contacting face of said second section to receive said projections 13; such recesses 14 are formed at/or adjacent one end of said second section 2 and a longitudinal slot 15 is formed along a major portion of the remaining length of said second section 2. As it results from the drawing the projections 13 extend partly into said recesses 14 and partly into the longitudinal slot 15. A U-shaped member 16 is slidably arranged on the second section and adapted to be engaged at the same time with both the first and second section thus preventing a relative movement thereof.

It is to be understood that our invention is not to be limited to the exemplary embodiment shown and described and such changes as come within the scope of the appended claim may be made without departing from the spirit of the invention.

What we claim is:

A hose clip comprising in combination: an encircling band having a first section and a second section, said sections being adapted to be secured in overlapping relation, a U-shaped member adapted to slidably engage said sections whereby the extent which said sections overlap may be adjusted, a resilient member arranged substantially in the form of a rectangle having two short sides and two long sides, one short side being pivoted to one end of said first section, a tension lever pivotally mounted on the other short side of said member, said long sides being bent outwardly thereby affording extensible means, and an external projection disposed on said band adjacent the free end of said second section, such projection constituting a fulcrum for said tension lever, said tension lever having a slot adapted to receive the free ends of said member, said free ends each having a downward bend whereby said free ends are adapted to fit loosely in said slot and retain said member in association with said tension lever, said first section having a plurality of projections disposed therealong and said second section having a plurality of recesses disposed therealong, said recesses being arranged to register with said projections thereby affording antislip means for said sections, said second section having a longitudinal slot adapted to receive a plurality of said projections, and said U-shaped member, in association with said overlapping sections being adapted to prevent relative movement of said sections.

References Cited in the file of this patent

UNITED STATES PATENTS

| | | |
|---|---|---|
| 252,430 | Cohen | Jan. 17, 1882 |
| 1,013,165 | Hunt | Jan. 2, 1912 |
| 1,277,076 | Ireland | Aug. 27, 1918 |
| 1,436,317 | Kriescher | Nov. 21, 1922 |
| 1,965,207 | Walker | July 3, 1934 |
| 2,495,667 | Vizner | Jan. 24, 1950 |

FOREIGN PATENTS

| | | |
|---|---|---|
| 283,295 | Italy | Mar. 7, 1931 |
| 451,384 | Germany | Oct. 21, 1927 |
| 308,394 | Italy | June 3, 1933 |